Feb. 11, 1947. G. M. EDDY 2,415,583
TIRE CHAIN
Filed Jan. 26, 1945
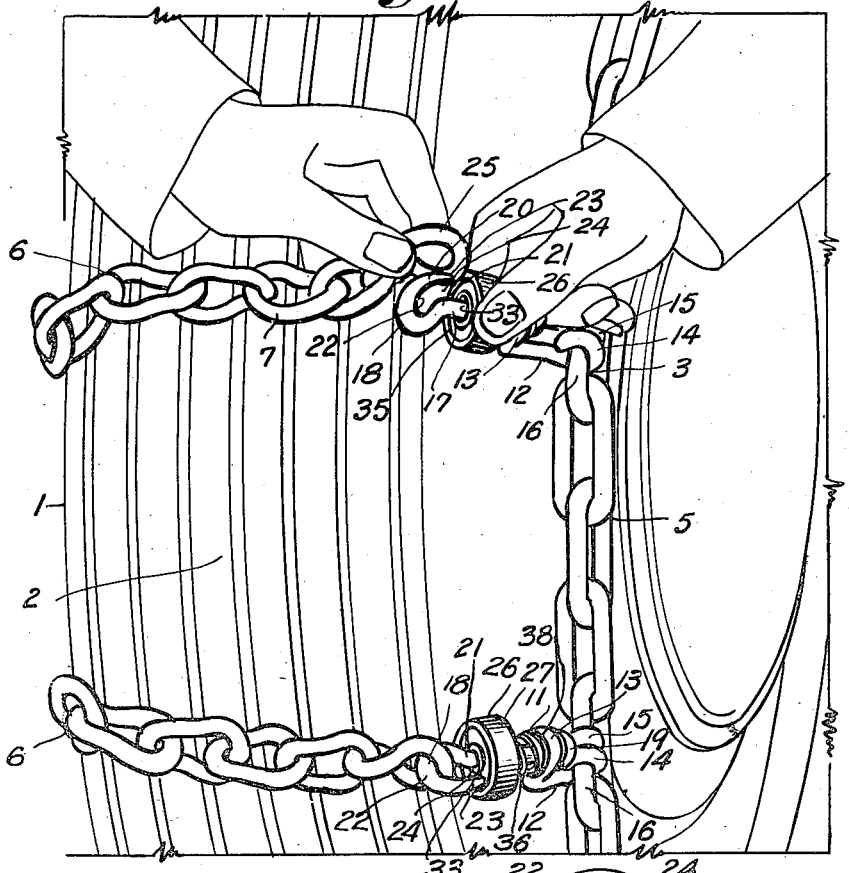
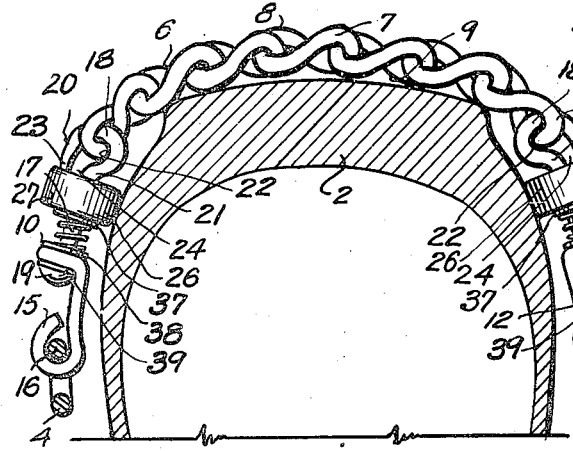
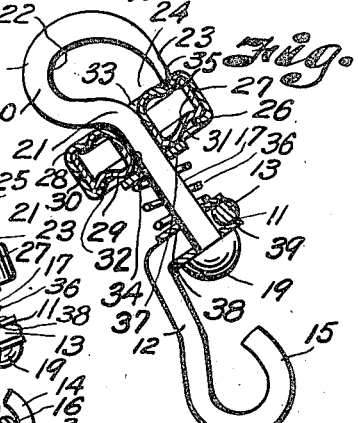
INVENTOR.
Glen M. Eddy.
BY
Fishburn & Mullendore
ATTORNEYS.

Patented Feb. 11, 1947

2,415,583

UNITED STATES PATENT OFFICE 2,415,583

TIRE CHAIN

Glen M. Eddy, Kansas City, Kans., assignor to The Roll-O-Matic Corporation, Denver, Colo., a corporation of Colorado Application January 26, 1945, Serial No. 574,733

6 Claims. (Cl. 152—242)

1

This invention relates to anti-skid devices and more particularly to tire chains such as used on vehicle wheels for enhancing traction, the principal object being to provide chains of this character with cross links which are adapted to swivel relatively to the carrier chains for presenting both sides thereof to the traction surface, thereby enhancing the wearability thereof, providing a smoother action and giving uniform traction on the wheels of a vehicle.

Further objects of the invention are to provide cross chains that are readily removable and easily replaced when worn; to provide a tire chain structure that adjusts itself snugly to the tire at all speeds and which will not burn or cut the tire; and to provide a tire chain wherein traction forces on the cross chains draw the chains in close contact with the tire so as to effect more silent action and avoid spinning of the wheel within the chain.

It is also an object of the invention to provide connections between the cross and carrier chains including light-weight, hollow rollers adapted to roll on the sides of a tire and support the connections for swiveling of the cross links and which serve to retain the cross links in hooked engagement.

In accomplishing these and other objects of the invention, I have provided improved structure, the preferred form of which is illustrated in the accompanying drawing wherein:

Fig. 1 is a perspective view of a portion of a wheel and tire equipped with a tire chain embodying the features of the present invention.

Fig. 2 is a cross section through the tire particularly illustrating one of the cross links and the swivel connections thereof with the side or carrier chains.

Fig. 3 is a sectional view through one of the connections, the hook member being shown in elevation.

Referring more in detail to the drawing:

1 designates an automobile wheel, 2 a tire mounted thereon, and 3, an anti-skid device, which embodies the features of the present invention. The device 3 includes a carrier member comprising side chains 4 and 5, each including a series of links adapted to be arranged circularly on the respective sides of the tire and which have ends adapted to be connected by conventional fasteners (not shown). The carrier chains 4 and 5 are connected at spaced points around the periphery of the tire by cross chains 6. Each cross chain includes a plurality of links 7 shaped and connected together to provide traction faces 8

2 and 9 on opposite sides thereof as best shown in Fig. 2, and which are adapted to be alternatively presented to the traction surface incidental to operation of swivel connections 10 and 11 with the carrier chain members as now to be described.

The connections each include a swivel link element 12 shaped to form an eye 13 at one end and parallel hooks 14 and 15 at the other, which hooks are adapted to engage the side bars 16 of selected links in the carrier chains and to be closed thereover so that they are retained as a permanent part of the side chains. The eye 13 is arranged at right angles to the hooks 14 and 15 and passes the shank 17 of a swivel hook element 18.

The shank 17 has an intergal head 19 to prevent withdrawal of the shank from the eye. A hook 20 is formed on the other end of each shank by bending the shank laterally in a rounding curve 21 then in a reverse curve 22 terminating in a relatively flat end 23 extending parallel with the shank but spaced from the curved portion 21 to provide an entrance space or passageway 24 for the endmost link 25 of the cross link that is to be connected thereto.

In order to support the swivel hooks so that they may swivel within the eye 13 and allow for turning of the chain from one side thereof to the other, the shanks 17 carry rollers 26 having relatively flat peripheral faces 27 adapted to roll upon the sides of the tire as shown in Fig. 2. The rollers are of light-weight, hollow construction and each roller is preferably formed of a pair of cup members 28 and 29 having annular flanges 30 and 31 sleeved one in the other and which are retained in sleeve condition by inwardly flanging the terminal edge of the outermost flange as indicated at 32 in Fig. 3. The central portion of the cup members are apertured as at 33 and have inwardly abutting flanges 34 to form a hub for mounting the roller on the shank 17 of the swivel hook. The cup member forming the side adjacent the terminal 23 of the hook is preferably provided with an annular groove 35 to receive the terminal 23 of the hook whereby the wheel forms a latch or gate for closing the entrance space 31 of the hook. The wheel is normally retained in position to close the passageway by a coil spring 36 sleeved on the shank 17 to exert sufficient pressure between the eye 13 and the wheel to normally support the wheel in the position shown in Fig. 3. Washers 37 and 38 are preferably inserted between the wheel 28, the eye 13, and the ends of the spring. A washer 39 is also preferably inserted between the eye 13 and the head 19 on the hook side thereof to provide a better bearing for the head of the swivel hook.

In assembling the swivel connections, the washer 39 is sleeved over the shank 17 prior to formation of the hook 20. The shank 17 is then passed through the eye 13 after which the washer 38, spring 36, washer 37, and wheel 28 are sleeved thereover. The hook 20 is then formed to shape with the terminal 21 spaced from the shank a sufficient distance to readily pass the endmost link of the cross chain that is to be connected thereto.

In assembling the swivel connections on the carrier chains, the hooks 14 and 15 are engaged with the side bars 16 of selected links to provide the desired spacing between the cross chains after which the ends of the hooks are clenched over the side bars to retain the swivel connections as permanent parts of the side chains. The cross links are then readily applied by drawing the wheels retractively on the shanks of the swivel hooks a sufficient distance to permit passing of the end links over the terminal ends of the hooks after which the wheels are released so that the springs 36 return them to latched position relative to the hooks.

Chains constructed and assembled as described, are applied to the tire of a wheel in the manner of an ordinary chain, however, by reason of the swivel mounting of the cross members, the chains are easier to apply and adjust circumferentially of the tire. When the chains are in position on the tire, the cross links have one of the flat sides thereof contacting the tread and the swivel connections are supported in spaced relation with the side faces of the tire by the wheels 28 as shown in Fig. 2. It is thus obvious that the cross chains are free to turn so as to present both sides 8 and 9 thereof to the traction surface, thereby greatly increasing the life of the cross chains and increasing the efficiency and performance of the chains on a wheel.

Since the cross chains are free to swivel, the one on the underside of the wheel that is engaging between the wheel and the traction surface will roll and cause tightening of the side chains and exert a substantially uniform tension on the other cross chains. The cross chains are thus kept in close contact with the tread of the tire providing a quieter action, a smoother ride, and better traction.

When chains are applied to both rear wheels of the vehicle, the chains will automatically adjust themselves to give substantially the same traction on both wheels and the tightening of the chain under operation prevents the wheels from spinning in the chains. The swivel connection of the cross links also prevents burning or cutting of the tire by the chain.

When the cross links become worn, they are readily removed by moving the rollers 28 retractively against the action of the springs 36 and unhooking the end links of the cross chains. New chains may then be applied by engaging the end links thereof with the swivel hooks. Upon relieving pressure exerted against the rollers, the springs return the rollers to latching position.

The hollow construction of the wheels is also an important feature as it provides a light-weight structure and avoids excessive wear on the shank of the swivel hooks.

From the foregoing it is obvious that I have provided a tire chain that is efficient in operation and wherein the cross links are of longer life since the links are free to turn and present both the sides thereof to the traction surface.

It is also obvious that worn links are readily removed and new cross links applied without the aid of tools.

What I claim and desire to secure by Letters Patent is:

1. In an anti-skid device including a cross member, a carrier member for the cross member, a connecting unit between said members including a swivel element connected with one of the members and having an eye portion, a hook element having a shank swivelly mounted in the eye portion and having a head engaging the eye portion, a link on the other member, said hook element having a hook portion extending from the end of the shank opposite said head with the terminal of the hook portion spaced from said shank to pass the link of said other member for connecting the cross member with the carrier member, a roller slidable coaxially on the shank to move from a position with a side of said roller in substantial contact with the terminal of said hook portion to a position spaced from said terminal to pass said link between the roller and said terminal, and a coil spring on the shank having one end exerting pressure against the roller at the side opposite the hook portion to retain the roller with said first mentioned side in contact with said terminal for closing the space through which the link is passed.

2. In an anti-skid device including a cross member having an end link, a carrier member for the cross member, a connecting unit between said members including a swivel element connected with the carrier and having an eye portion, a hook element having a shank swivelly mounted in the eye portion and having a head engaging the eye portion, said hook element having a hook portion extending from the end of the shank opposite said head with the terminal of the hook portion spaced from said shank to pass the end link of the cross member over the terminal of the hook portion for connecting the cross member with the carrier member, a roller slidable coaxially on the shank to move from a position with a side of the roller in substantial contact with the terminal of said hook portion to a position spaced from said terminal to pass said end link between the roller and said terminal, and a coil spring on the shank having one end exerting pressure against the roller to retain the roller yieldingly in said first position for securing the link in the hook portion of said hook element.

3. In an anti-skid device including a cross member, a carrier member for the cross member, a connecting unit between said members including a swivel element connected with one of the members and having an eye portion, a hook element having a shank swivelly mounted in the eye portion and having a head engaging the eye portion, a link on the other member, said hook element having a hook portion extending from the end of the shank opposite said head with the terminal of the hook portion spaced from said shank to pass the link of said other member for connecting the cross member with the carrier member, a hollow roller having a hub slidable coaxially on the shank to move from a position with a side of the roller in substantial contact with the terminal of said hook portion to a position with said side spaced from said terminal to pass said end link therebetween, and a coil spring exerting pressure against the opposite side of the roller to retain the roller yieldingly in said first mentioned position for closing the space through which the link is passed.

4. In an anti-skid device, a connector for securing a cross member to its carrying member including a swivel element having an eye portion, a hook element having a shank swivelly mounted in the eye portion and having a head engaging said eye portion for preventing the shank from pulling out of the eye portion, said hook element having a hook portion extending from the end of the shank opposite said head with the terminal of the hook portion spaced from said shank for passing a link of one of the members therebetween, a roller coaxially slidable on the shank to move from a position with a side thereof in substantial contact with the terminal of said hook portion to a position spaced from said terminal to pass the link between the roller and said terminal, and a coil spring on the shank having one end exerting pressure against the roller at the side opposite the hook portion to move the roller on the shank into said first mentioned position.

5. In an anti-skid device, a connector for securing a cross member to its carrying member including a swivel element having an eye portion, a hook element having a shank swivelly mounted in the eye portion and having a head engaging said eye portion for preventing the shank from pulling out of the eye portion, said hook element having a hook portion extending from the shank opposite the head and having a flat terminal spaced from said shank for passing a link on one of said members therebetween, a roller coaxially slidable on the shank to move from a position with the side thereof in substantial contact with the flat terminal of said hook to a position spaced from said terminal to pass the link between the roller and said terminal, and a spring on the shank having one end exerting pressure against the roller at the opposite side of the hook to move the roller on the shank into said first mentioned position.

6. In an anti-skid device, a connector for securing a cross member to its carrying member including a swivel element having an eye portion, a hook element having a shank swivelly mounted in the eye portion and having a head engaging said eye portion for preventing the shank from pulling out of the eye portion, said hook element having a hook portion extending from the shank opposite the head and having a flat terminal spaced from said shank for passing a link on one of said members therebetween, a roller coaxially slidable on the shank and having an annular groove in a side thereof to receive the flat end of said hook portion and to move away from the hook portion for opening the space between said flat end and the groove side of the roller, and a spring on the shank having one end exerting pressure against the roller at the side opposite the hook portion to yieldingly retain the roller on the shank with the groove engaging the flat terminal of said hook portion.

GLEN M. EDDY.

REFERENCES CITED

The following references are of record in the file of this patent:

UNITED STATES PATENTS

| Number | Name | Date |
|---|---|---|
| 1,636,209 | Bergstein | July 19, 1927 |
| 1,325,627 | Dow | Dec. 23, 1919 |
| 1,817,547 | Eddy | Aug. 4, 1931 |
| 1,548,113 | Bridge | Aug. 4, 1925 |